INVENTOR
WILLIAM J. McBRIDE
BY Robert J. Zinn
ATTORNEY

DIGITAL DATA ERROR DETECTION APPARATUS
Original Filed Jan. 4, 1966 2 Sheets-Sheet 2
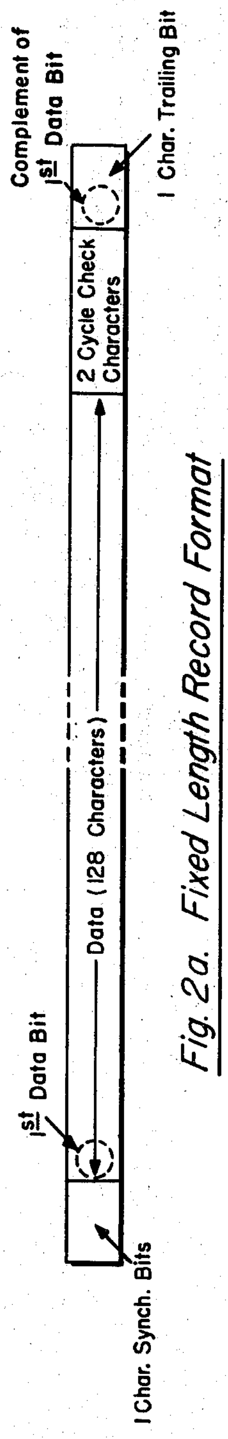
Fig. 2a. Fixed Length Record Format
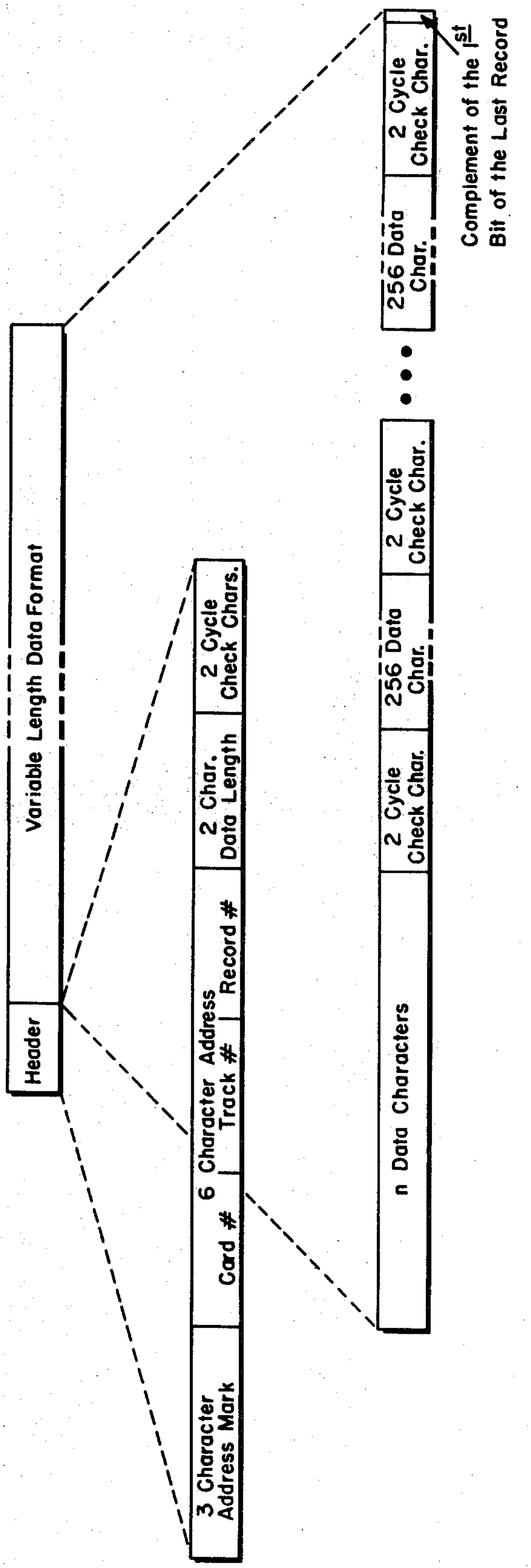
Fig. 2b. Variable Length Record Format

United States Patent Office 3,560,924

Patented Feb. 2, 1971

3,560,924

DIGITAL DATA ERROR DETECTION APPARATUS

William J. McBride, Wayland, Mass., assignor to Honeywell Inc., Minneapolis, Minn., a corporation of Delaware Continuation of application Ser. No. 518,724, Jan. 4, 1966. This application Oct. 1, 1969, Ser. No. 862,974

Int. Cl. G06f *11/12;* H03k *5/18;* H04l *7/10*

U.S. Cl. 340—146.1 9 Claims

ABSTRACT OF THE DISCLOSURE

In a digital information transfer system incorporating a cyclic code error checking scheme, an apparatus for sensing errors resulting from an end-around shift complements the first bit of serially transmitted data and appends it to the transmitted message, thereby providing additional information by which to sense errors not otherwise detectable by a cyclic checking scheme alone.

This is a continuation of the copending application Ser. No. 518,724, filed Jan. 4, 1966, now abandoned.

A general object of the present invention is to provide a new and improved apparatus useful in the detection of errors occurring in a digital data representation. More specifically, the present invention is concerned with a new and improved apparatus useful in monitoring information being transferred and for providing means for indicating the occurrence of an error condition in the information being transferred and wherein said apparatus is provided with means to protect against errors introduced through the checking technique itself.

Data processing systems are widely used for carrying out many varied forms of data manipulation associated with record keeping, arithmetical operations and other similar data processing functions. The data which is handled or manipulated generally takes the form of electrical signals of the on-off type, or pulse type, which are arranged in predetermined or preselected combinations to define, in binary-type notation, zeros and ones. These zeros and ones in turn represent desired alpha-numeric combinations of data.

The handling and manipulation of data in a data processing system may involve, in addition to other things, the transfer of the data between selected parts of the data processing system. For example, many data processing systems have associated therewith bulk storage devices wherein large amounts of digital data are recorded on some magnetic medium such as a magnetic tape, drum, or card file. Inasmuch as the transfer of data from the magnetic recording medium into the system involves electro-mechanical functions, there is always the likelihood that an error condition will be created in this transfer. The likelihood of an error occurring is present either in the writing or in the reading operation associated with the data transfer. Inasmuch as large amounts of data are manipulated by the data processing systems in relatively short periods of time, it is essential that the occurrence of an error condition be promptly detected and steps taken to effect the correction thereof.

Before it is possible to carry out the data correcting operations, it is first necessary to provide facilities for detecting the presence of an error condition. Past techniques of error detection have employed any one of a number of code structures which provide redundancy information for both error detection and correction.

One of the major breakthroughs in coding theory was the introduction of the concept of cyclic or polynomial codes. A cyclic code is defined in terms of a generator polynomial P(X) of degree $n-k$. A polynomial of degree less than $n$ is designated as a code polynomial, if and only if it is evenly divisible by the generator polynomial P(X).

As utilized for error detection purposes in a binary code configuration of fixed or variable length, the successive bits in a message to be transferred, may be interpreted as the coefficients of an associated polynomial expression. Thus, a 128 character record of six bits per character corresponds to a polynomial expression of 767 terms having a base two and coefficients represented by the respective ones and zeros of the passage.

For a message of $k$ binary digits to which $n-k$ are to be attached, a code polynomial may be formed by multiplying the polynomial of degree $k$ by a generator polynomial P(X). A convenient method of encoding a message polynomial G(X), is to divide Mod 2, a power of the message polynomial, $X^{n-k}G(X)$, by an appropriate generator polynomial P(X), and add the remainder R(X), resulting from the division to form a code polynomial F(X). This follows from the definition of the code polynomial $$X^{n-k}G(x)=Q(x)P(x)+R(x)$$

and from the fact that in Modulo 2 arithmetic, addition and subtraction are the same, so that the resultant polynomial $$F(X)=X^{n-k}G(X)+R(X)=Q(X)P(X)$$

is necessarily a code polynomial. The code polynomial so generated is characterized in that the highest order coefficients of F(X) comprise the coefficients of the message G(X), while the low order $n-k$ coefficient of F(X) comprise the check digits. It follows from the above that if after extraction from memory, a previously generated code polynomial is divided through by a generator polynomial and a remainder results, an error in transmission has occurred.

According to the usual definition, a cyclic code is further characterized in that a cyclic shift of a code polynomial also results in a code polynomial. Thus, an end-around shift or permutation of the code word results in another code word. In a conventional implementation, this defining characteristic of the cyclic codes may severely limit the usefulness of this particular code structure when utilized for error detection purposes.

The present invention constitutes an improvement over previously known types of error detecting apparatus employing cyclic codes for error detection purposes.

It is therefore a more specific object of the present invention to provide a new and improved apparatus which is adapted to utilize cyclic codes for error detecting purposes.

In a representative type of apparatus incorporating a preferred embodiment of the invention, the data being manipulated is related to data transferred to and from a data storage drum or mass memory file both of which are adapted to store data in any one of a plurality of tracks. The data is further arranged in records of fixed or variable length dependent upon the type of storage apparatus involved. In a fixed length record such as is associated with a magnetic drum, the information is stored in a serial fashion and may consist of 128 six-bit data characters followed by two six-bit check characters. As indicated above, the check characters represent the remainder resulting from the division of the message by the generator polynomial. Errors due to the cyclic nature of the codes are easily introduced into the system as a result of mis-synchronization. More specifically, a cyclic code is defined such that if the following bit representation:

110 . . . 001 is a code polynomial; i.e., a digital representation which exactly is divisible by the generator polynomial; then the bit representation:

10 . . . 0011 is likewise a code polynomial. This follows from the definition of the cyclic code which is defined such that an end-around shift of one or more bits comprising a cyclic code results in a sequence of bits which is also a cyclic code.

Mis-synchronization in the sensing mechanism of a data processing system implemented with a cycli-code error detection technique may result in the mis-sensing of one of the lead-in bits in a particular record, consequently the first data bit in a $k+(n-k)$ bit record may be misconstrued as one of the synchronizing bits normally associated with the lead-in portion of a record. Thus, when the data and check bit contents of the record have been read, the system finds itself short one bit and thus attempts to complete the record transfer by sensing one of the trailing bits which may be appended to the end of the data record for the purpose of preventing magnetic spreading of the bits already laid down. Alternatively, and in the absence of the magnetic spreading bits, the sensing continues into the introductory bits of the next record. If now the first data bit of the record had been a one and since the magnetic spreading preventive bits are generally arbitrarily selected as ones, then the mis-synchronization and consequent faulty message transfer, would go undetected.

In accordance with another object of the present invention, means are provided to prevent against errors induced through mis-synchronization of the information transfer by sensing the identity of the first bit in a record being laid down and inserting the complement thereof as the first bit following the data and check bits comprising the complete record.

The advantages which make the cyclic codes superior to other known codes when used for error detection purposes includes the ability to detect both single and double errors. In this respect, the cyclic codes may have a limitation with respect to the detection of double errors in a record which exceeds the optimum double error detection capabilities of the generator polynomial.

Accordingly, it is another feature of the present invention to provide means whereby a record of extended length appears to the checking circuitry as a series of records not exceeding approximately 2000 bits in length, but which is interpreted in the processing and memory portions of the data processing system as a contiguous record.

The foregoing objects and features of novelty which characterize the invention, as well as other objects of the invention, are pointed out with particularity in the claims annexed to and forming a part of the present specification. For a better understanding the invention, its advantages and specific objects attained with its use, reference should be had to the accompanying drawings and descriptive matter in which there is illustrated and described a preferred embodiment of the invention.

Of the drawings:

FIG. 2A shows a fixed length record format which further exhibits features of the present invention; and FIG. 2B shows a variable length record format also exhibiting the check features of the present invention.

Figure 1:
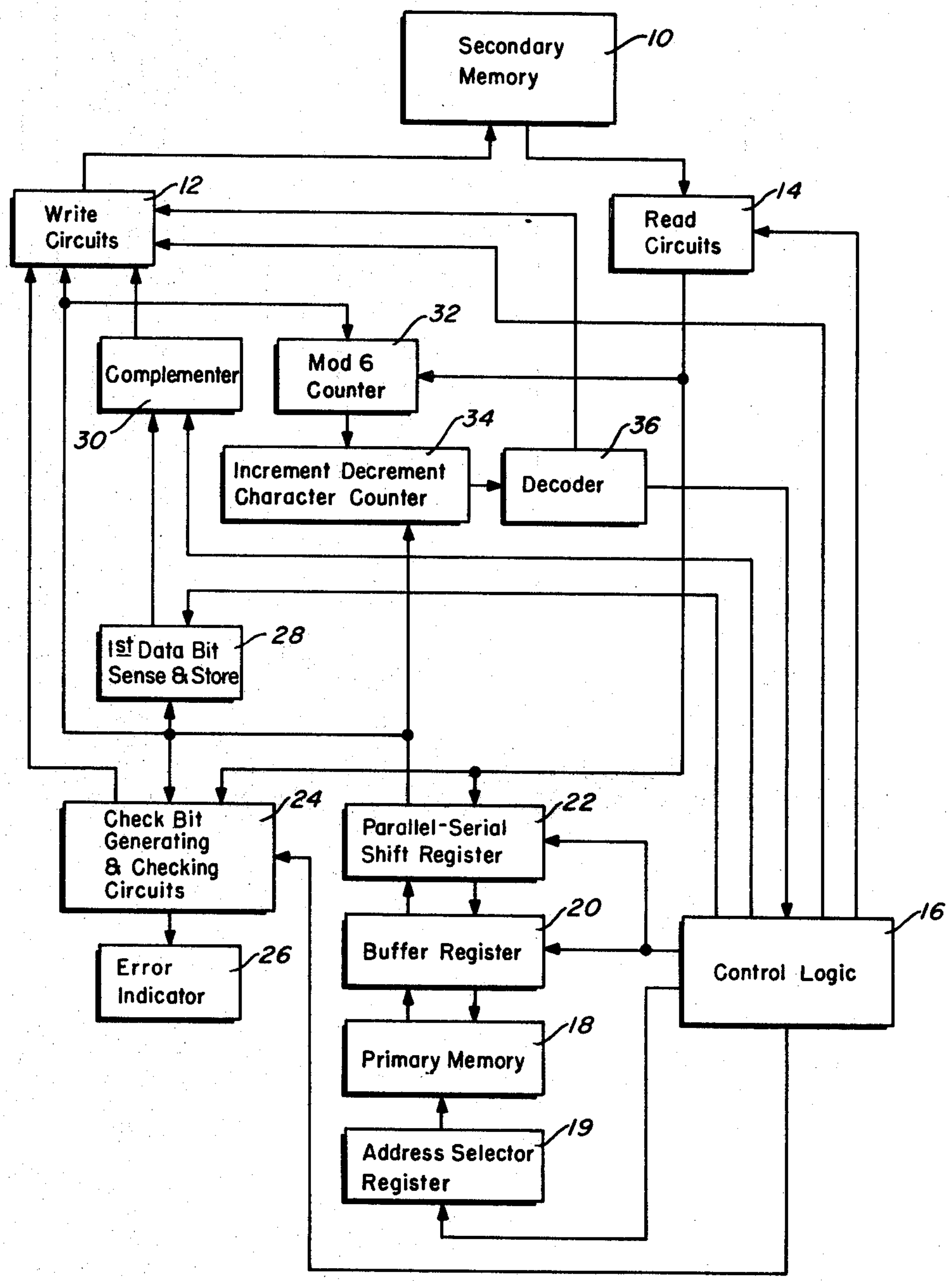
FIG. 1 is a diagrammatical representation of those portions of a data processing apparatus related to and including the present invention.

Considering first the apparatus disclosed in FIG. 1, therein is shown in diagrammatical form an arrangement of the essential part of a data processing system having associated therewith means for implementing the teaching of the present invention. The apparatus illustrated includes means for transferring data between primary and secondary memory stores and for generating checking information to be associated therewith. More specifically, the apparatus in FIG. 1 discloses a secondary memory store indicated therein generally as member 10 as being connected through transfer circuitry to a primary memory store 18. Although the present invention is adaptable for use with any bulk storage device, for purposes of the present explanation the secondary memory may be assumed to be a conventional mass memory file. Accordingly, the secondary memory will comprise a plurality of magnetic cards on which a variable length record has been recorded by appropriate electro-magnetic means indicated herein as write circuits 12. The control of the writing operation of data into the secondary memory is initiated by way of suitable control logic indicated generally at 16.

Since the control logic 16 is not pertinent to the understanding of the present invention, it is not disclosed in detail herein. Any form of microprogrammable control element or control sequence circuitry can be adapted to generate the appropriate signal levels for activating the various elements of FIG. 1 in the manner described herein. For example, the control logic 16 can take the form of either the microprogram control units disclosed at pp. 463–467 of the text entitled "Computed Design Fundamentals" authorized by Yaohan Chu, published by McGraw-Hill Book Company Inc., copyright 1962 or the control sequence circuits disclosed in U.S. Pats. 3,157,862 and 3,201,762 assigned to the assignee named herein.

Sensing of information previously recorded on the magnetic cards, comprising the secondary memory 10, is accomplished by way of read circuits 14. The write circuits 12 and read circuits 14 contain appropriate address registers which in turn receive signals from the control logic 16 identifying the location within the secondary memory 10 from whence or into which information is to be transferred. The control logic 16 provides means for activating address selecting means associated with the secondary memory 10 and for regulating the operation of the write circuits 12 and read circuits 14. An address selector register 19 under control of signals generated in the control logic 16, is shown connected to the primary memory 18. The address selector register references locations in the primary memory 18 into which or from which information is to be transferred.

Information being transferred between the secondary memory store 10 and the primary memory store 18 is routed through a buffer register 20 as well as a parallel-to-serial shift register 22. The latter may be in the form of the parallel-to-serial shift register disclosed in U.S. Pat. No. 3,157,858 which issued to C. J. Barbagallo on Nov. 17, 1964.

The data representing signals being transferred between the primary and secondary memory stores are arranged to be fed into an appropriate check bit generating and error detection circuit indicated herein as member 24. Thus, check bits generated from information being transferred from the primary memory 18 to the secondary memory 10 are transferred from the cycle check logic 24 to the write circuits 12 under control of signals generated in the control logic 16. Information being transferred from the secondary memory 10 to the primary memory 18 is monitored for errors in the error detection portion of the cycle check logic 24. In this respect, error indicating means 26 are associated with the output of the cycle check logic 24. The error indicating means may take the form of an error indicating light on the console, which when energized, indicates to the person operating the data processing system that an error has occurred. Alternatively, the error indicating means may be connected directly to the control logic portion of the data processing system so that upon the occurrence of an error, the system will automatically respond in a predetermined fashion. The automatic response of the system may effect a temporary stall in the processing operations or else a sub-sequence routine may be initiated to effect a correction operation.

Connected at the output of the parallel-to-serial shift register 22 is a first bit storage register 28 which senses and stores the first bit of each block of data being transferred from the primary memory 18 to the secondary memory 10. The transfer of the contents of the first bit storage register is under the control of the control logic 16. In this respect, the output of the register 28 is transferred through a conventional complementing circuit 30 to the write circuits 12. The circuit 28 for performing the sensing and storing of the first data bit as well as the other logical functions used in the present invention may be of the form described in section beginning on p. 31 of the book "Arithmetic Operations in Digital Computers" by R. K. Richards, published 1955 by D. Van Nostrand Co. The function and operative nature of the first bit storage register 28 and the associated complementing circuit will be more fully appreciated in light of the explanation of the operation of FIG. 1 which follows.

As indicated above, the preferred embodiment of the present invention operates in a character mode wherein each character has associated therewith six data bits. It was further stated that the record could be of indeterminate length although a fixed length record was equally accommodable. It has also been indicated that the cyclic codes represent a particularly powerful technique for effecting error detection and correcting operations but that some of the power is lost after a record length of some 2000 bits has been exceeded. Accordingly, in that embodiment of the present invention designed to handle a fixed length record, the record length has been limited to 128 six-bit characters. To accommodate the counting, a Mod 6 counter 32 is positioned to monitor information being transferred between the write circuits 12, the read circuits 14 and the serial shift register 22. The Mod 6 counter 32 may take the form of a conventional six stage ring counter implemented to generate an output pulse each time its highestmost stage is switched to its set condition. The output pulse from the counter 32 is in turn connected as an input to an associated incrementing-decrementing counter 34. In the preferred embodiment of the present invention, the counter 34 comprises a conventional 12-bit binary coded counter operative in its decrementing mode to accommodate variable length records and in the incrementing mode to accommodate a fixed length record.

A decoder 36 is connected to the output of the character counter 34 and is implemented to recognize particular bit configurations occurring therein and upon the detection thereof to initiate, through the control logic 16, the insertion of appropriate check information into a data record being transferred from the primary memory 16 to the secondary memory 10. During the transfer of information from the secondary memory 10 to the primary memory 18, the combination of the Mod 6 counter 32, the character counter 34 and the decoder 36 effect the generation of control signals to control logic 16 which in turn signals the cycle check logic 24 that a complete record has been read in and that an error check proceeding somewhat simultaneously therewith should be culminated with the generation of an error indicating signal if appropriate.

Considering the overall operation of the circuitry of FIG. 1, it should be understood that the apparatus illustrated represents a portion of a complete data processing system of the stored program type. In this respect, the control logic circuitry 16 is first assumed to have present therein a write order which directs the transfer of a fixed length record of information from the primary memory 18 to the secondary memory 10. Before proceeding further with an explanation of the operation of the circuitry of FIG. 1, reference is made to FIG. 2A which discloses the bit configuration of a fixed format record such as is referred to above. The actual data portion of the record is preceded by six special purpose bits usually all ones, used for synchronizing purposes. Following the six special purpose bits is a 128 character (768 bits) data field. The bit configuration comprising the data field is in turn followered by two six-bit characters representing the checking bits. In a conventional record it would be normal to follow the checking bit with an additional special purpose configuration usually consisting of four or five microseconds of ones which in addition to establishing a trailing edge marker for the record also act to prevent magnetic spreading of the last of the checking bits. The magnetic spreading is a problematic phenomena common to the magnetic recording field.

The information to be transferred is stored in the primary memory 18 in character form and is transferred in parallel through the buffer registers 20 and into the parallel-serial shift register 22. The information is shifted in a serial fashion from the shift register 22 to the cycle check logic 24 and the write circuits 12. As the serial transfer is initiated, the first data bit of the block of characters presently being transferred is stored off in register 28. The serial information also enters the cycle check logic of member 24 and is divided therein Mod 2 by the generator polynomial in accordance with the theory advanced above. The actual hardware for effecting the division may be of the form disclosed in the paper of W. W. Peterson and B. T. Brown entitled "Cyclic Codes for Error Detection" which appeared at pp. 228 through 235, Proceedings of the IRE, January 1961.

As the bits comprising the data field are transferred serially out of the shift register 22 and into the write circuits 12, they are simultaneously routed into the Mod 6 counter 32 and a count is transferred to the character counter 34 as every sixth bit is registered in the former. After the counter 34 has registered the predetermined count of 128 characters, this condition is sensed in the decoder 36 which in turn transfers a signal to the control logic 16 indicating the completion of the transfer of the data contents of the record. The decoder further transfers a control signal to the write circuits 12 directing the latter to accept two characters of check bits from the check bit generating circuit 24. The control logic 16 in turn transfers a conditioning signal to the cycle check logic of member 24 to initiate the transfer of the two characters of check bits. Accordingly, the transfer of information from the primary memory 18 ceases while the division operation proceeding in the cycle check logic 24 is carried to completion. The remainder from the division operation is then transferred directly to the write circuits 12 and from thence to the two check character locations associated with the record being stored.

After the check bits have been stored, a signal is generated within the control logic 16 to initiate a transfer of the contents of the first data bit storage register 28 which is first complemented in member 30 and is then transferred via write circuit 12 to the next succeeding bit location of the record following the last of the bits comprising the two check characters. In the preferred embodiment of the present invention, the complement of the first data bit is recorded in the first of the bit positions normally occupied by the trailing bits.

In the next phase of the operation of the circuitry of FIG. 1, it is assumed that the control logic 16 has present therein a read order which directs the secondary memory 10 to transfer the fixed length record previously stored to the primary memory 18. The information is transferred serially from the secondary memory through the read circuits 14 and from thence into the parallel-serial shift register 22. Somewhat simultaneously, the information is transferred via the read circuits 14 to the cycle check logic 24 wherein a division Mod 2 using the generator polynomial as a divisor, is initiated. The successive bits to be transferred from the read circuits 14 to the shift register 22 are also sensed by the Mod 6 counter 32 which in turn registers the character count in the counter 34. When the count in counter 34 has reached 128, this condition is sensed by the decoder 36 which in turn signals the control logic 16 that the data transfer portion of the read operation is complete. Meanwhile the error check operation continues in the cyclic check logic of member 24. In this respect, after the last check bit is transferred from the read circuits 14 to the shift register 22 and has been entered into the cycle check logic 24, the generator polynomial completes its division in the Mod 2 mode, whereafter the remainder registered in the cycle check logic is checked to verify that it is zero. In the absence of a zero remainder, a signal is generated in the error indicator circuit 26 to establish that an error has occurred in the transmission of the information.

Assume now that mis-synchronization has occurred during the present reading operation thus resulting in the failure to sense the first of the synchronizing bits and consequently causing the first of the data bits to be interpreted as the last synchronizing bit. In such instances, the transfer operation would continuously run one bit behind. This means that each character being stored within the primary memory 18 would consist of 5 bits from one character as actually stored within the secondary memory 10 while the 6th bit would be the first bit of an adjacent character. Thus, after the last of the check bits is fed into the checking logic of member 24, the latter is still looking for another bit. The transfer thus continues with the first of the trailing bits being transferred into the checking logic as the missing check bit.

In accordance with the practice of the present invention, the first of the trailing bits has been defined as the complement of the first data bit. Thus, upon receipt of the complement of the first data bit, the division Mod 2 within the checking logic of member 24 will be completed and an error signal will be generated within member 26.

If, however, no means had been provided to enter the complement of the data bit and the first data bit had been a one, then since the trailing bits are conventionally defined as a string of ones, the error due to missynchronization would go undetected. As outlined above, this necessarily follows from the definition of the cyclic codes in that if the sequence of bits:

$$a_1, a_2, a_3 \ldots a_{n-1}, a_n$$

is a code word, then the sequence:

$$a_2, a_3 \ldots a_{n-1}, a_n, a_1$$

is also a code word.

In the absence of trailing bits, the sensing mechanism associated with the read circuits 14 would have sensed the first synchronizing bit of the succeeding record which in turn would have been interpreted as the missing bit. In accordance with normal procedures, the synchronizing bits are conventionally represented as a string of binary ones so that if the first bit of the mis-synchronized record had been a one, the error due to the mis-synchronization would likewise have gone undetected.

In like manner, in a conventional data processing system using cyclic codes for error detection purposes wherein all zeros are used to represent the synchronizing and trailing bits of a record, the combination of mis-synchronization and the fact that the first data bit is a zero will result in the error due to mis-synchronization going undetected. However, in a data processing system implemented in accordance with the teaching of the present invention, the insertion of the complement of the first data bit in the bit position immediately following the data and check bits will eliminate mis-synchronization as a source of errors.

The technique applied here may be extended to any desired degree to ensure against mis-synchronization in excess of one bit length. In this respect, the storage mechanism of member 28 may be replaced by sensing circuitry which automatically conditions the trailing edge bit generating means, not shown, whereby, the trailing bits will all represent the complement of the first data bit.

Consideration is now given to another exemplary operation of the present invention wherein the secondary memory 10 takes the form of a mass memory file capable of storing messages of variable length. In this embodiment, counter 34 is operative in a decrementing fashion when information is being transferred between the secondary memory and the primary memory 18. In this respect, counter 34 is preset to a value corresponding to the total number of characters to be transferred.

Although the practice of the present invention is not limited to any particular type of secondary or bulk memory, the mass memory file used in the practice of the present invention may be assumed to be of the magnetic card type capable of storing a plurality of variable length records on any one of a number of tracks associated with each card. Each record is further characterized by a header portion followed by a variable length data area.

Referring now to FIG. 2B, therein is shown a variable length record format including header and data portions. The initial portion of the header is indicated as comprising an 18 bit address mark which comprises a special bit configuration distinguishing this portion of the record as being address oriented. Following the address mark is a six character address of which two characters identify a particular mass memory card, two characters identify the particular track on that card, and two characters identify a particular record on the selected track. Following the address portion of the header is a two character bit configuration defining the length of the record. The header portion of the variable length record is concluded with two characters of checking information.

The data portion of the variable length record is indicated as comprising a plurality of character blocks with each block, save the first, being comprised of 256 data characters. Each block is segmented by two cycle check characters. Thus the variable length record may be thought of as comprising a plurality of fixed length record and a variable length record. The variable length block is by definition shorter than the fixed length blocks and in fact is defined as the remainder left after dividing the total length by 256 characters.

Consider now the overall operation of the circuitry of FIG. 1 in a circuit configuration wherein the secondary memory 10 takes the form of a card implemented mass memory capable of storing variable length records. Assume further that the control logic circuitry 16 has present therein an order directing the transfer of a variable length record from the primary memory 18 to the secondary memory 10. The transfer operation is initiated with the header portion of the record to be transferred being scanned in control logic 16 to establish the address within the secondary memory 10 to which the information is to be transferred. In addition, the information identifying the number of characters comprising the variable length record is transferred through the read circuits 14 and the parallel-serial shift register 22 and from thence into the increment-decrement character counter 34 so as to preset the latter to a specific register count.

The actual transfer is initiated in response to signals generated in the control logic 16 and continues in much the same manner as occurs in the transfer of fixed length record is explained above. In this respect, the first portion of the record to be transferred to the write circuit 12 comprises the N characters defining the remainder left after dividing the total record length by 256. In accordance with the technique expressed above which is designed to prevent error due to the mis-synchronization of the transfer operation, the first data bit of the first character of the block of N data characters is stored in member 28. This and subsequent bits comprising the N character block are also transferred to the write circuits 12 and the check bit generating and checking circuit 24. As the information is shifted serially into the write circuit 12 and from thence to the secondary memory 10, an indication of each transfer cycle is registered in the Mod 6 counter 32 which in turn transfers one output signal for every six input signals. The output of the Mod 6 counter 32 is used to decrement the preset counter stored in counter 34. The decoder 36 attached to the counter 34 is conditioned to recognize a bit representation within counter 34 indicative of a multiple of the 256 character blocks being transferred. More specifically, the occurrence of eight zeros in the low order position of the 12 bit character counter 34 indicates that there remains to be transferred from primary memory 18 an integral number of character blocks, each comprising 256 characters. When this condition obtains, a signal is transferred from the decoder 36 to control logic 16 which in turn effects a temporary halt to the further transfer of information from the primary memory 18 and the associated buffer and shift registers 20 and 22 respectively. At the same time, a signal is transferred from the decoder 36 to the write circuits 12 directing the latter to accept from the check bit generating and checking circuit 24 a series of 12 check bits which are in turn stored in the new character positions immediately following the N character record transfer. A signal is transferred from the control logic 16 to the check bit generating and checking circuit 24 to initiate the transfer of the check bits to the write circuits 12.

In accordance with the operation of the system explained above with respect to the fixed length record transfer, a further signal is normally generated in the control logic 16 which enables the contents of the first data bit store to be transferred in complemented fashion through the write circuits 12 for storage in the next succeeding bit position within the secondary memory 10. However, since at this point in the transfer operation, an error due to mis-synchronization will carry through the entire record to be transferred, the insertion of the complement bit is delayed until the decrementing counter 34 registers a zero count. At such time, the information content of the first data bit store 28 is gated through the complementer 30 and write circuits 12 into the next succeeding bit position of the secondary memory.

To appreciate the reason for only inserting the complement of the last block of data to be transferred, it should be noted that as the transfer operation is initiated for each new block of 256 characters, the first bit of the first character thereof is entered into the first data bit store 28 in replacement of the first data bit of the preceding block so that the bit to be transferred therefrom after the last block of 256 characters has been transferred through the write circuits and into the secondary memory 10 corresponds to the mis-synchronization bit for the last block of 256 characters. Since an error due to the mis-synchronization will affect the first block of characters being transferred by causing the checking logic of member 24 to treat the first bit of a succeeding block as the last bit of the block being checked, and since it is possible that the first bit of the next block to be sensed is of the same nature as the first bit of the block presently being checked, it is possible for an error to shuffle through successive blocks undetected. However, if a mis-synchronization error has occurred and the complement of the first bit of the last block being transferred is entered as the first of the trailing bits, an error signal will always be generated in the error indicator 26 after the last block of 256 characters has been transferred. Although each block of 256 characters, as well as the variable length block of N characters is treated independently insofar as the generation of check bits is concerned, only a single mis-synchronization bit is stored off with the information comprising a variable length record.

The transfer of the variable length record is completed as the counter 34 is decremented to zero thereby indicating to the control logic 16 that no further transfer from the primary memory 18 is to be effected save the check bits associated with the last record as well as the mis-synchronization bit for that record.

During the read cycle of a variable length record transfer, signals are generated in the control logic 16 which identify a particular record to be read. Accordingly, scanning means associated with the read circuits 14 and the control logic 16 scan the header areas of the respective records stored in a secondary memory 10 until the desired record is located, whereafter the information defining the length of the record is transferred by read circuits 14 into the parallel-serial shift register 22 and is then used to preset the decrement counter 34. As the information comprising each block of characters is transferred from the secondary memory 10 into the primary memory 18, a checking operation is performed in member 24 in accordance with the technique outlined above. As the information is transferred serially through the read circuits 14, an indication of each bit transferred is registered in the Mod 6 counter 32 which in turn pulses the decrement counter 34 once after the receipt of every six bits. In this manner, the respective characters of successive blocks are transferred into the primary memory store 18. As the final block of characters is transferred, the mis-synchronization error detection technique becomes operative and results in the generation of an error indicating signal in member 26 provided that such an error has actually occurred.

It will be apparent from a consideration of the foregoing specification, that there has been illustrated and described a new and improved apparatus useful in detecting and correcting ceratin types of errors that may be encountered in a transfer apparatus associated with an electronic data processing system. While in accordance with the provisions of the statutes, there has been illustrated and described the best form of the invention known, it will be apparent to those skilled in the art that changes may be made in the apparatus described without departing from the spirit of the invention, as set forth in the appended claims, and that in some cases, certain features of the invention may be used to advantage without a corresponding use of other features.

Having now described the invention, what is claimed as new and novel and for which it is desired to secure by Letters Patent is:

1. In an error detection apparatus employing cyclic codes for the detection of errors occurring during the transfer and storage of a digital data representation, said apparatus including a primary memory store, a secondary memory store, means connected to said primary and secondary memory stores for initiating the transfer of the data contents thereof to said secondary memory store means connected to the output of said primary memory store for generating checking information pertinent to the data currently being transferred from said primary to said secondary memory store, and means connecting the output of said checking information generating means to the input of said secondary memory store, the improvement comprising: means further connected to the output of said primary memory store for sensing the first data bit of said data being transferred from said primary to said secondary memory store, and means connected to said secondary memory store to become operative at the completion of the transfer of said data and checking information to cause the storage of the complement of said first data bit in said secondary store whereby the subsequent restoration of said data information to said primary memory store will be in a manner which is free of errors due to mis-synchronization.

2. In a data processing apparatus including cyclic code generating means utilized to generate check bits for a binary coded message, said apparatus including a data source for storing said binary coded message, recording means and transfer means connecting said data source to said recording means; the improvement comprising: means connected to said transfer means to sense the first of said data bits comprising a message being transferred and for storing an indication thereof, and means operative upon completion of the transfer of said binary coded message and said checking bits to said recording means to cause the storage of the complement of said first data bit therein.

3. In a data processing apparatus including error detection means operative with cyclic codes, a source of digital data, a secondary memory store, and transfer means connecting said source of digital data to said secondary memory store and for causing a transfer of digital data therebetween; the combination comprising: cyclic code generating means connected to said transfer means and to said secondary memory store for generating checking information from digital data being transferred to said secondary memory for storage therein, means to sense the termination of said digital data transfer, and means operative upon completion of said transfer of the digital data and said generated checking information to cause the storage of the complement of at least the first digit so transferred.

4. In data processing apparatus including a source of binary coded data, recording means, transfer means including means connecting said data source with said recording means for effecting the transfer of a quantity of binary coded data from said data source to said recording means for storage therein, cyclic code generating means, and means including said transfer means connecting said quantity of binary coded data to the input of said cyclic code generating means and for connecting the output therefrom to said recording means; the combination comprising: sensing means connected to sense the first data bit of said quantity of binary coded data being transferred from said data source to said recording means, and means responsive to the completion of the transfer of said quantity of binary coded data and said cyclic checking information to said recording means to cause the recording of the complement of said first data bit.

5. In a data processing apparatus for transferring information from a data source to a secondary memory store, said apparatus including cyclic code error detecting means, a data source, and transfer means connecting the output of said data source to said secondary memory store, the improvement comprising: means to sense the first bit of a binary coded message being transferred from said data store to said secondary memory and for storing an indication thereof, counting means connected to said transfer means for monitoring the number of bits being transferred for storage in said secondary memory, and control means for terminating the transfer of data and checking information after a predetermined number of bits have been transferred as detected by said counting means to said secondary memory and means for transferring the complement of said first data bit to said secondary memory for storage therein.

6. In a data processing system including means to transfer a binary coded message of extended length by segmenting said message into portions of predetermined length, and cyclic code generating means for continuously generating checking information pertinent to the binary coded message being transferred, the combination comprising: means connected to said transfer means to sense the binary significance of at least the first data bit of each portion of said binary coded message as it is transferred and to temporarily store an indication thereof, means connected to sense the completion of the transfer of each portion of said binary coded message and to interrupt said transfer operation so as to connect to said transfer means signals representing the current contents of said cyclic code generating means, means including said last named means operatively connected to said first bit sensing and storage means to effect the resetting thereof after the insertion of the checking information for each save the last portion of said binary coded message, and means including said last named means operative upon completion of the transfer of said binary coded message and associated checking information for connecting to said transfer means the complement of the contents of said first bit sensing and storing means.

7. In data processing apparatus including means to transfer a binary coded message of extended length by segmenting said message into a number of portions of predetermined length, a primary memory store, a secondary memory store, control means connected to said primary and secondary memory stores for initiating the transfer of the data contents thereof to said secondary memory store, and cyclic code generating means connected to the output of said primary memory store for continuously generating checking information pertinent to the binary coded message being transferred from said primary to said secondary memory store, the improvement comprising: means further connected to the output of said primary memory store for sensing the binary significance of at least the first data bit of each portion of said binary coded message and for temporarily storing an indication thereof, a decrementing counter connected to the input of said secondary memory store, said decrementing counter being initially preset to register the total number of bits constituting means responsive to the transfer of successive bits from said primary to said secondary memory to decrease the digital representation registered therein, decoding means connected to said counting means to recognize particular bit configurations occurring within said counter indicative of the completion of the transfer of the respective portions of the binary coded message, means including said decoding and control means operatively connected to said first bit sensing and storage means to effect the resetting thereof for each save the last portion of said binary coded message, means for transferring said checking information to said secondary store upon completion of the transfer of said binary coded message as detected by said counter and decoding means, and means operative upon completion of the transfer of said binary coded message and associated checking information for connecting the complement of the contents of said first bit sensing and storage means to the input of said secondary memory, means for transferring said checking information to said secondary store upon completion of the transfer of said binary coded message as detected by said counter and decoding means.

8. In an error detection method employing cyclic codes for the detection of errors occuring during the transfer and storage of a digital data representation, said method including the steps for initiating the transfer of data contents of a primary memory to a secondary memory store, and generating checking signals pertinent to the data contents currently being transferred from said primary to said secondary memory store, said error detection method further comprising the steps of:

sensing a signal representative of the first data bit of said data contents being transferred from said primary to said secondary memory store, and storing a signal representing the complement of said first data bit in said secondary store at the completion of the transfer of said data contents and said checking information signals, whereby the subsequent restoration of said data information contents to said primary memory store will be in a manner which is free of errors due to mis-synchronization.

9. In the machine storage and error checking of digital data signals on a record medium, the method of storage and detection of errors in a message including the steps of segmenting said message into portions of predetermined length and generating continuously, cyclic codes checking information signals for each portion of said binary coding message being transferred, said method further comprising the steps of:

sensing and storing the binary significance of a signal representing at least a first data bit of each portion of said binary coded message as it is being transferred;

transferring cyclic code checking information signals thereof at the completion of the transfer of each portion of the binary coded message, and transferring the complement of the signals obtained in said sensing and storing step for only a last portion of said message for recording thereof upon the completion of the transfer of said binary coding message and associated checking information signals for each portion thereof.

References Cited

UNITED STATES PATENTS 3,398,400 8/1968 Rupp et al. --------- 340—146.1

MALCOLM A. MORRISON, Primary Examiner

R. S. DILDINE, Jr., Assistant Examiner

U.S. Cl. X.R.

178—69.5; 340—172.5